(12) United States Patent
Fergus et al.

(10) Patent No.: US 9,672,601 B2
(45) Date of Patent: *Jun. 6, 2017

(54) SYSTEM, METHOD AND COMPUTER-ACCESSIBLE MEDIUM FOR RESTORING AN IMAGE TAKEN THROUGH A WINDOW

(71) Applicant: New York University, New York, NY (US)

(72) Inventors: Rob Fergus, New York, NY (US);
David Eigen, Brooklyn, NY (US);
Dilip Krishnan, Jersey City, NJ (US)

(73) Assignee: New York University, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/187,224

(22) Filed: Jun. 20, 2016

(65) Prior Publication Data

US 2016/0300333 A1 Oct. 13, 2016

Related U.S. Application Data

(63) Continuation of application No. 14/575,179, filed on Dec. 18, 2014, now Pat. No. 9,373,160.

(60) Provisional application No. 61/917,717, filed on Dec. 18, 2013.

(51) Int. Cl.
| | |
|---|---|
| *G06K 9/36* | (2006.01) |
| *G06T 5/00* | (2006.01) |
| *G06K 9/46* | (2006.01) |
| *G06K 9/66* | (2006.01) |

(52) U.S. Cl.
CPC ............ *G06T 5/005* (2013.01); *G06K 9/4604* (2013.01); *G06K 9/66* (2013.01); *G06T 2207/20084* (2013.01); *G06T 2207/30248* (2013.01)

(58) Field of Classification Search
CPC .. G06T 2207/20021; G06T 5/20; G06T 5/002
See application file for complete search history.

(56) References Cited

U.S. PATENT DOCUMENTS

| | | | |
|---|---|---|---|
| 9,165,369 B1* | 10/2015 | Zhang | G06T 7/0081 |
| 2010/0183217 A1* | 7/2010 | Seung | G06K 9/342 |
| | | | 382/156 |
| 2015/0110386 A1* | 4/2015 | Lin | G06T 5/002 |
| | | | 382/159 |

OTHER PUBLICATIONS

Barnum, P., et al. "Analysis of rain and snow in frequency space." International Journal of Computer Vision (IJCV) 86, 2, 256-274; 2010.
Bottou, L., and Bousquet, O., "The tradeoffs of large scale learning." In Advances in Neural Information Processing Systems (NIPS), 161-168; 2008.

(Continued)

*Primary Examiner* — Brian P Werner
(74) *Attorney, Agent, or Firm* — Andrews Kurth Kenyon LLP

(57) ABSTRACT

Systems, methods and computer-accessible mediums for modifying an image(s) can be provided. For example, first image information for the image(s) can be received. Second image information can be generated by separating the first image information into at least two overlapping images. The image(s) can be modified using a prediction procedure based on the second image information.

22 Claims, 9 Drawing Sheets

(56) References Cited

OTHER PUBLICATIONS

Burger, H., et al. "Image denoising: Can plain neural networks compete with BM3D?" In IEEE Conf. on Computer Vision and Pattern Recognition (CVPR); 2012.
Dabov, K., et al., "Image denoising with block-matching and 3D filtering." In Proc. SPIE Electronic Imaging; 6064, 606414; 2006.
Dong, B., et al "Wavelet frame based blind image inpainting." Applied and Computational Harmonic Analysis 32, 2, 268-279; 2011.
Elad, M., and Aharon, M. "Image denoising via learned dictionaries and sparse representation." In IEEE Conf. on Computer Vision and Pattern Recognition; 2006.
Farabet, C. et al. "NeuFlow: A runtime reconfigurable dataflow processor for vision." In Proc. of the 5th IEEE Workshop on Embedded Computer Vision; 2011.
Garg, K., and Nayar, S. "Detection and removal of rain from videos." In IEEE Conf. on Computer Vision and Pattern Recognition (CVPR), 528-535; 2004.
Gu, J., "Dirty Glass: Rendering Contamination on Transparent Surfaces." In Proceedings of Eurographics Symposium on Rendering; 2007.
Gu, J., Removing Image Artifacts Due to Dirty Camera Lenses and Thin Occluders. ACM Transactions on Graphics (Proceedings of SIGGRAPH Asia) Dec. 2009.
Jain, V., and Seung, S. "Natural image denoising with convolutional networks." In Advances in Neural Information Processing Systems (NIPS); 2008.
Lecun, Y. et al., Gradient-based learning applied to document recognition. Proceedings of the IEEE 86, 11 (Nov. 1998), 2278-2324.
Levin, A., and Nadler, B. "Natural image denoising: Optimality and inherent bounds." In IEEE Conf. on Computer Vision and Pattern Recognition (CVPR); 2011.
Ning, F. et al., "Toward automatic phenotyping of developing embryos from videos." IEEE Trans. on Image Processing 14, 9, 1360-1371; 2005.
Olshausen, B. A., and Field, D. J. "Sparse coding with an overcomplete basis set: A strategy employed by V 1?" Vision Research 37, 23, 3311-3325; 1997.
Paris, S., and Durand, F. "A fast approximation of the bilateral filter using a signal processing approach." In European Conf. on Computer Vision (ECCV), IV: 568-580; 2006.
Portilla, J., at al. "Image denoising using scale mixtures of Gaussians in the wavelet domain." IEEE Trans Image Processing 12, 11 (Nov. 2003), 1338-1351.
Roser, M., and Geiger, A. "Video-based raindrop detection for improved image registration." In ICCV Workshop on Video-Oriented Object and Event Classification; 2009.
Roser, M., et al. "Realistic modeling of water droplets for monocular adherent . . . curves." In ACCV Workshop on Computer Vision in Vehicle Technology: From Earth to Mars; 2010.
Roth, S., and Black, M. J. "Fields of experts." International Journal of Computer Vision (IJCV) 82, 2, 205-229; 2009.
Tomasi, C., and Manduchi, R. "Bilateral filtering for gray and color images." In IEEE Conf. on Computer Vision and Pattern Recognition (CVPR); 1998.
Willson, R. G., et al "An optical model for image artifacts produced . . . lenses." In 8th Int'l Symposium on Artificial Intelligence, Robotics,& Automation in Space, vol. 1; 2005.
Xie, J., et al. "Image denoising and inpainting with deep neural networks." In Advances in Neural Information Processing Systems (NIPS); 2012.
Zhang, S., and Salari, E. "Image denosing using a neural network based non-linear filter in the wavelet domain." In ICASSP; 2005.
Zhou, C., and Lin, S. 2007. Removal of image artifacts due to sensor dust. In IEEE Conf. on Computer Vision and Pattern Recognition (CVPR).
Zhu, S. C., and Mumford, D. "Prior learning and gibbs reaction-diffusion." IEEE. Pattern Analysis and Machine Intelligence (PAMI) 19,11, 1236-1250; 1997.
Zoran, D., and Weiss, Y. "From learning models of natural image patches to whole image restoration." In International Conf. on Computer Vision (ICCV). 2011.

* cited by examiner

Figure 1A
Figure 1B
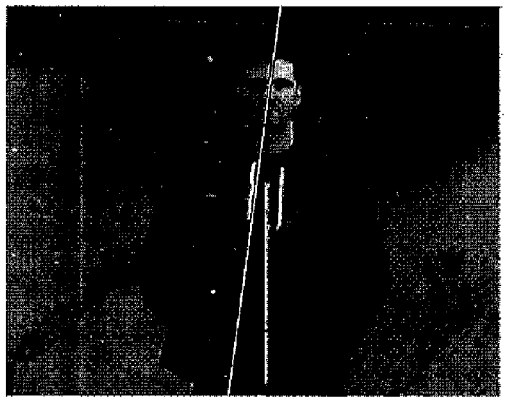
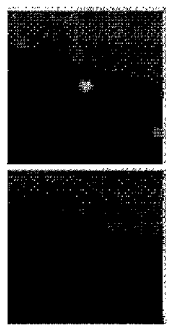
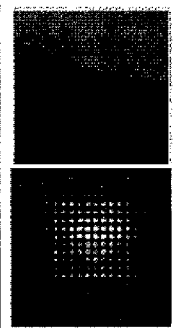
Figure 2A   Figure 2B   Figure 2C

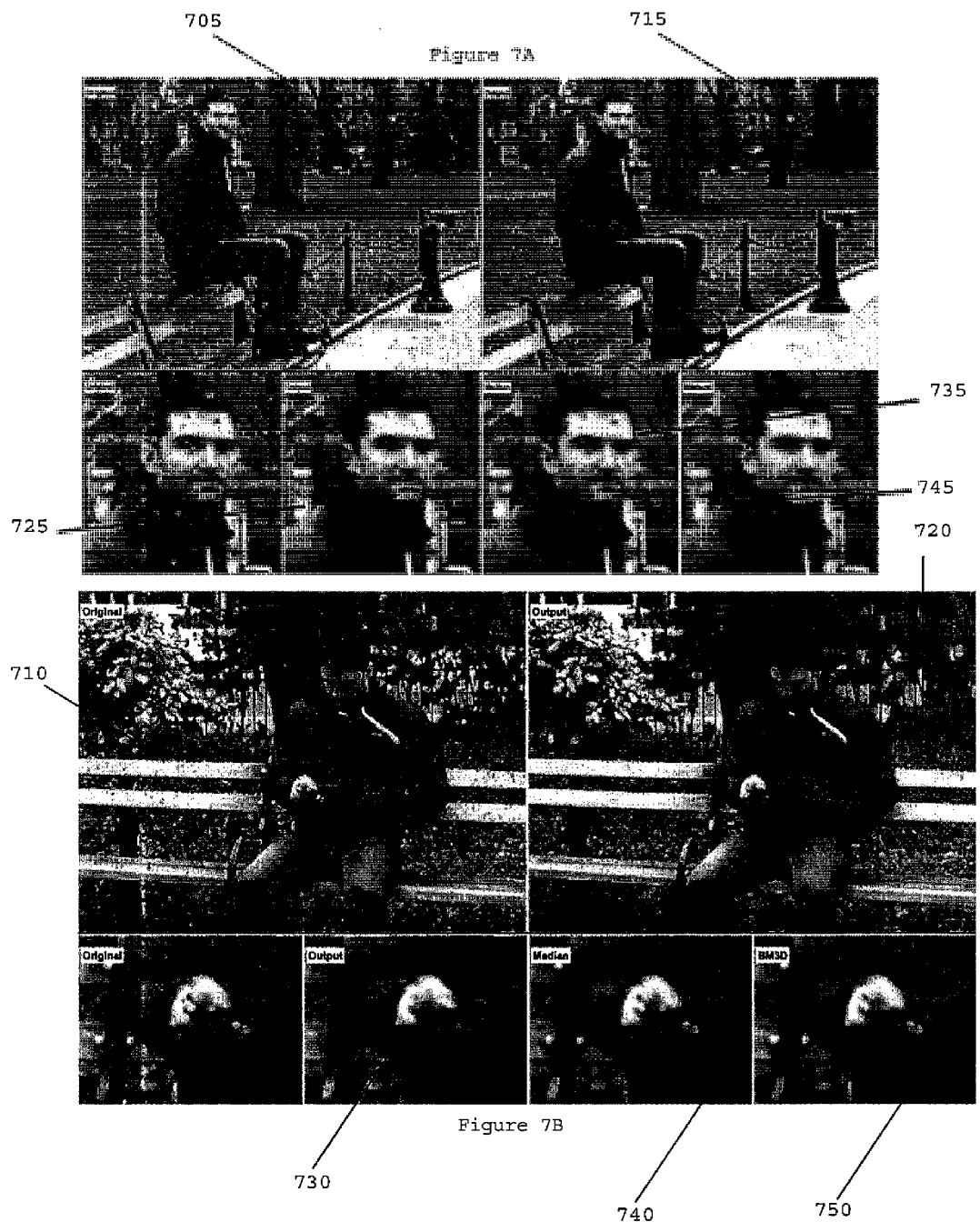

SYSTEM, METHOD AND COMPUTER-ACCESSIBLE MEDIUM FOR RESTORING AN IMAGE TAKEN THROUGH A WINDOW

CROSS-REFERENCE TO RELATED APPLICATION(S)

This application relates to and claims priority from U.S. Non-Provisional patent application Ser. No. 14/575,179 filed on Dec. 18, 2014, which is issued as U.S. Pat. No. 9,373,160 on Jun. 21, 2016, and from U.S. Patent Application No. 61/917,717, filed on Dec. 18, 2013, the entire disclosures of which are incorporated herein by reference.

FIELD OF THE DISCLOSURE

The present disclosure relates generally to image restoration, and more specifically, to exemplary systems, methods and non-transitory computer-accessible mediums for removing dirt, rain or other debris from an image taken through a window.

BACKGROUND INFORMATION

There can be a number of situations in which images or video can be captured through a window. A person can be inside a car, train or building, and may wish to photograph a scene outside. Indoor situations can include exhibits in museums or zoos, which can typically be protected by glass. In addition, many cameras can now be mounted outside, for example, on buildings for surveillance, or on vehicles to prevent collisions. These cameras can be protected from the elements by an enclosure with a transparent window. Such images, however, can be affected by many factors including, for example, reflections and attenuation. As shown in FIG. 1A, these artifacts can significantly degrade the quality of the captured image.

A conventional approach to removing occluders from images can be, for example, to defocus them to the point of invisibility. This can be done by placing the camera right up against the glass, and using a large aperture to produce small depth-of-field. However, this has to be done at the time of capture, and in practice, it can be hard to get the camera sufficiently close to the occluders due to multiple layers of glass, or some difficulty approaching the window. Furthermore, such approach assumes that the camera has a fast lens and control of the aperture. This can be a particular issue for smartphone cameras, where the user can have little control over the exposure. The problem can be exacerbated by the small sensor size which can increase the depth-of-field. Correspondingly, shots with smartphone cameras through dirty or rainy glass still have significant artifacts, even if placed close to the window, as shown in FIG. 9A.

The use of machine learning for image denoising can be widespread. An early approach (see e.g., Reference 26) learns an energy function on the output of linear filters applied to the image. Closely related methods explore different bases and energy functions for example: sparse overcomplete filters (see e.g., Reference 15), wavelet decomposition (see e.g., Reference 17) and a Field-of-Experts model. (See e.g., Reference 20). Other approaches (see e.g., Reference 27) use a large Gaussian mixture model ("GMM") to directly model the distribution of natural image patches. These approaches (1) only consider additive white Gaussian noise ("AWGN"), which can be simpler than structured noise and (ii) build generative models of clean image patches.

Neural networks have previously been explored for denoising natural images, mostly in the context of AWGN (see e.g., References 11, 14 and 24). Although more challenging than AWGN, the corruption can still be significantly easier than the highly variable dirt and rain drops.

Removing localized corruption can be considered a form of blind inpainting, where the position of the corrupted regions may not be given, unlike traditional inpainting. (See e.g., Reference 6). The removal of salt-and-pepper noise has been shown (see e.g., Reference 5), although such approach does not extend to a multi-pixel corruption. Recently, other work has indicated how an unsupervised neural-network can perform blind inpainting, demonstrating the removal of text synthetically placed in an image. (See e.g., Reference 23). However, the noiseless text has different statistics to natural images. Thus, it can be easier to remove than rain or dirt which can vary greatly in appearance, and can resemble legitimate image structures.

Several methods explore the removal of rain from images, which include addressing (see e.g., References 1 and 8), rather than droplets on glass. For example, one approach uses defocus, while the other approach uses frequency-domain filtering. Both benefit from video sequences rather than a single image, however. Other approaches illustrate methods for detecting raindrops in a single image. (See e.g., References 18 and 19) However, these methods do not demonstrate removal.

It has been previously illustrated how lens dust and nearby occluders can be removed, but this method requires extensive calibration, or a video sequence, as opposed to a single frame (see e.g., Reference 10). Other work has shown how dirt and dust can be removed. (See e.g., References 22 and 25). One approach removes defocused dust for a Mars Rover camera, while the other approach removes sensor dust using multiple images and a physics model. However, there does not currently exist a method for removing dirty water and debris from an image taken through a window.

Thus, it may be beneficial to provide exemplary systems, method and computer-accessible medium that can remove dirty water and debris from an image taken through a window, and which can overcome at least some of the deficiencies described herein above.

SUMMARY OF EXEMPLARY EMBODIMENTS

Systems, methods and computer-accessible mediums for modifying an image(s) can be provided. For example, first image information for the image(s) can be received. Second image information can be generated by separating the first image information into at least two overlapping images. The image(s) can be modified using a prediction procedure based on the second image information. The exemplary prediction procedure can include, e.g., an average prediction determination for each overlapping pixels of the overlapping images. The prediction procedure can also include predicting a clean image for one of the overlapping images. The prediction procedure can be associated with a neural network that can receive each of the overlapping images as an input. In some exemplary embodiments of the present disclosure, the neural network can include a series of layers, and each of the layers can apply a linear map to one of the overlapping images. Each of the layers can also apply an element-wise sigmoid to one of the overlapping images. The neural network can be a convolutional neural network. The exemplary modification can include removing components of the image(s) associated with dirt, debris or water from a picture taken through a window. The neural network can include at least three neural networks, a first neural network for the removal of dirt, a second neural network for the removal of debris and a third neural network for the removal of water.

The first image information can include information from a picture taken through a window having dirt, debris or water thereon. The modification can include removing components of the image(s) associated with the dirt, the debris or the water from the picture.

According to certain exemplary embodiments of the present disclosure, a weight(s) can be generated for the prediction procedure, for example, by minimizing a mean squared error over a dataset of corresponding noisy and clean image pairs. The weight can also be decorrelated. A loss of the mean squared error can be minimized, which can be performed using a Stochastic Gradient Descent. A gradient of the error can be determined by backpropagating a depatchifying procedure. In certain exemplary embodiments of the present disclosure, the weight(s) can be initialized by randomly drawing from a normal distribution with a mean of 0 and a standard deviation of 0.001.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which:

FIG. 1A is an exemplary photograph taken through a window covered in dirt;

FIG. 1B is an exemplary photograph taken through a window covered in rain;

FIG. 2A is a set of exemplary images of a 64×64 region with dirt occluders (top image) and target ground truth clean image (bottom image) according to exemplary embodiment of the present disclosure;

FIG. 2B is a set of exemplary images showing exemplary results obtained using non-convolutional trained networks according to exemplary embodiment of the present disclosure;

FIG. 2C is a set of exemplary images showing exemplary results obtained using convolutional trained networks according to exemplary embodiment of the present disclosure;

FIGS. 7A and 7B are exemplary images of water images being restored according to an exemplary embodiment of the present disclosure;

Figure 3:
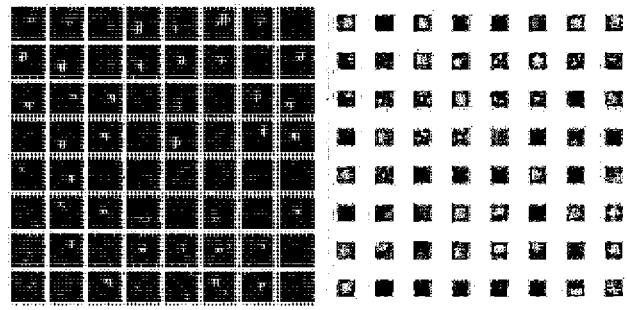
FIG. 3 is a set of exemplary images of rain model network weights according to an exemplary embodiment of the present disclosure.

Throughout the drawings, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments and is not limited by the particular embodiments illustrated in the figures, and appended claims.

DETAILED DESCRIPTION OF EXEMPLARY EMBODIMENTS

Exemplary Approach

To restore an image from a corrupt input, a clean output can be predicted using a neural network. The same network architecture can be used, for example, for all forms of corruption. However, a different network can be trained for dirt and for rain. This can facilitate the network to tailor its detection capabilities for each task. The exemplary system, method and computer-accessible medium, according to exemplary embodiments of the present disclosure, can be trained using an error loss that can account for patch averaging, and, as described below, can be special instances of convolutional neural networks.

Exemplary Architecture

Given a noisy image x, the goal can be to predict a clean image y that can be close to the true clean image y*. This can be accomplished by first splitting the input x into overlapping patches $\{x_p\}$=patchify(x), and predicting a corresponding clean patch $y_p=f(x_p)$ for each $x_p$. Then, the image y=depatchify($\{y_p\}$) can be formed by taking the average of the patch predictions at pixels where they overlap. The prediction function $f$ can be a multilayer neural network that takes a small patch as input.

The network $f$ can be composed of a series of layers $f_l$, each of which can apply a linear map to its input, followed by an element-wise sigmoid (e.g., implemented using hyperbolic tangent). Concretely, if the number of layers in the network can be L, then, for example:

$$f_0(x_p)=x_p \qquad (1)$$

$$f_l(x_p)=\tanh(W_l f_{l-1}(x_p)+bi), l=1,\ldots,L-1 \qquad (2)$$

$$f(x_p)=W_L f_{L-1}(x_p)+b_L \qquad (3)$$

For example, $x_p$ can be a vector whose elements can be the red, green and blue values at each pixel of the input patch. If $n_l$ can be the number of units at layer l, then $W_l$ can be $n_l \times n_{l-1}$ matrix of weights, and $b_l$ can be a vector of size $n_l$ containing the output bias for layer l. The last layer's output dimension $n_L$ can be the number of pixels in the output patch $y_p$ times the number of color channels.

On a full image x, the prediction $y=F(x)$ can be obtained by applying $f$ to each patch $x_p$ where, for example:

$$f(x) = \text{depatchify}(\{f(x_p) : x_p \in \text{patchily}(x)\}) \quad (4)$$

The exemplary system, method and non-transitory computer-accessible medium, according to the embodiment of the present disclosure, the input patches $x_p$ can be sized about 16×16×3, and the output patches $y_p$ can be sized about 8×8×3. Two hidden layers (e.g., L=3) can be used, each with about 512 units. Thus, $W_1$ can have a size of about 512×768, $W_2$ can have a size of about 512×512, and $W_3$ can have a size of about 192×512.

Exemplary Training

The weights $W_l$ and biases $b_l$ can be trained by minimizing the mean squared error over a dataset $D=(x_i, y^*_i)$ of corresponding noisy and clean image pairs. The error minimized can be obtained from the full prediction function F—including patchification and depatchification.

Figure 5:
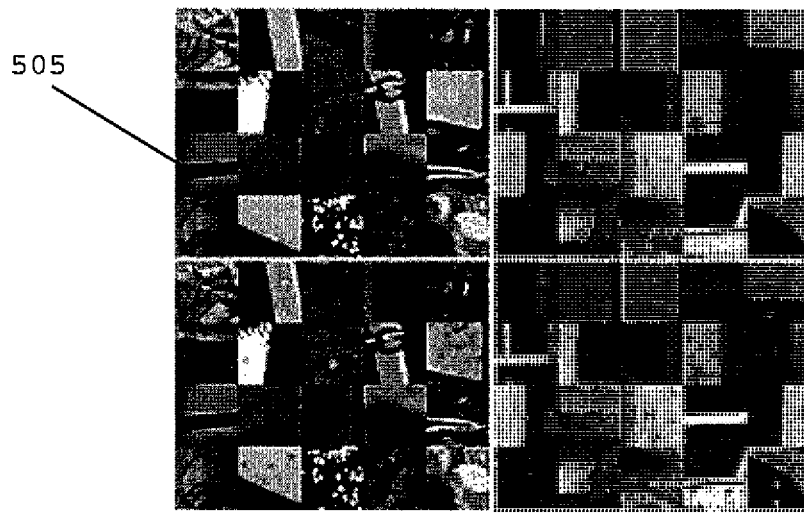
FIG. 5 is a set of exemplary images illustrating examples of clean and corrupted patches used for training according to an exemplary embodiment of the present disclosure.

Including the depatchifying process, the loss can be, for example:

$$J(\theta) = \frac{1}{2|D|} \sum_{i \in D} \|F(x_i) - y_i^*\|^2 \quad (5)$$

where $\theta = W_1, \ldots, W_L, b_1, \ldots, b_L)$, can be the model parameters. The 2 pairs in the dataset D can be random 64×64 pixel subregions about 505 of training images with and without corruption. (See e.g., FIG. 5). These can be patchified with a stride of 1 to produce about 2401 input patches of size 16×16, on which the neural network $f$ can be run to produce output patches of size 8×8. These can be depatchified to produce a 56×56 pixel prediction $y_i$, which can be compared against the middle 56×56 pixels of the true clean patch $y^*_i$.

The loss can be minimized using Stochastic Gradient Descent ("SOD"). (See e.g., Reference 2). The update for a single step at time t can be, for example:

$$\theta^{t+1} \leftarrow \theta^t - \eta_t (F(x_i) - y_i^*)^T \frac{\partial}{\partial \theta} F(x_i) \quad (6)$$

where $n_l$ can be the learning rate hyper-parameter and i can be a randomly drawn index from the training set. To compute the gradient of the error, the depatchify operation used to find $F(x_i)$ can be back propagated through. Since this can perform a linear average of overlapping patches, its derivative can split the error back out, weighted by the amount of overlap at each pixel (e.g., the denominator of each pixel's average). Thus, for example:

$$(F(x_i) - y_i^*)^T \frac{\partial}{\partial \theta} F(x_i) = \sum_p E_p^T \cdot \frac{\partial}{\partial \theta} f(x_{ip}) \quad (7)$$

where, for example:

$$\{E_p\} = \text{patchify}((F(x_i) - y^*_i)/m) \quad (8)$$

$$\{x_{ip}\} = \text{patchify}(x_i) \quad (9)$$

The error can be element-wise divided by the mask in containing the number of overlapping patches at each pixel location. The gradient can be further back propagated through the network $f$ as in a standard feed-forward neural network. FIG. 3 shows examples of weights learned for the rain model. The weights can be initialized at all layers by randomly drawing from a normal distribution with mean 0 and standard deviation 0.001. The biases can be initialized to 0. The learning rate can be about 0.001 with decay, so that $\eta_t = 0.001/(1+5t \cdot 10^{-7})$. No momentum or weight regularization can be used.

Exemplary Equivalence to Convolutional Network

Because the training error can be back propagated through depatchification, the exemplary network can be an instance of a convolutional neural network. (See e.g., Reference 12). Indeed, the initial patchification and first layer linear map together can comprise a convolution with $n_1$ image convolution kernels of size 16×16×3, where $n_1$ can be the number of output units in the first layer. Similarly, the last layer map and depatchification together can be the same as a convolution with 3 kernels of size 8×8×$n_{L-1}$, where $n_{L-1}$ can be the number of input units to the last layer. The middle layers, however, may not be convolutional.

Training convolutionally can have the effect of decorrelating the individual patch predictions $y_p$ in the areas where they overlap. As an illustrative example, consider adjacent patches $y_1$ and $y_2$, with overlapping regions $y_{o1}$ and $y_{o2}$, respectively, and desired output $y^*_o$. If the training can be performed according to the individual predictions, the loss would minimize $(y_{o1} - y^*_o) + (y_{o2} + y^*_o)^2$, the sum of their error. However, if the error of their average can be minimized, the loss becomes, for example:

$$\left(\frac{y_{o1} + y_{o2}}{2} - y_o^*\right)^2 \propto (y_{o1} - y_o^*)^2 + (y_{o2} - y_o^*)^2 + 2(y_{o1} - y_o^*)(y_{o1} - y_o^*) \quad (10)$$

The new mixed term can push the individual patch errors to go in opposing directions. Since each prediction can also be pulled in the direction of the true output $y^*_o$, this can effectively encourage decorrelation of the errors, resulting in improved overall accuracy. FIGS. 2A-2C show examples of such a decorrelation. Here, it can be seen that the output from each patch can contain a piece of noise and their average. Without convolutional loss, as in previously known systems (see e.g., Reference 3), each prediction can leave the same residual trace of the noise, which their average then maintains. With the convolutional loss used by the exemplary system, method and computer-accessible medium, however, the individual predictions decorrelate where not perfect, and average to a better output.

Exemplary Test-Time Evaluation

To run the exemplary network on a new test image x, x can be patchified and run for the patch-level network $f$ on each patch, as in Eqn. 1. The individual patch predictions can be depatchified to produce the final result $y=F(x)$. Because $f$ can run independently on each patch, for example, no synchronization is needed between patches until the final averaging. This makes the exemplary network simple to parallelize using GPU hardware. Furthermore, when using a multi-megapixel image, it can be simple to run the exemplary network in blocks. The Exemplary block outputs can be accumulated into in an image output buffer, using summation, then each pixel can be divided by the number of its contributing output patches (e.g., the counts array m). The exemplary Matlab GPU implementation can restore a 3888×2592 color image in approximately 60 s using a nVidia GTX 580, and a 1280×720 color image in approximately 7 s.

Exemplary Training Data Collection

The exemplary network can have about 753,664 weights and about 1,216 biases which can be set during training. A large number of training patches can be used to avoid over-fitting (e.g., memorization) of the training set.

Exemplary Removal of Dirt

To train the exemplary system, method and computer-accessible medium to remove dirt noise, clean/noisy image pairs can be generated by synthesizing dirt on images. The dirt noise can be well-modeled by an opacity mask and additive component, which can be extracted from real dirt-on glass panes in a lab setup. The exemplary extraction procedure is described below. Once the masks are created, noisy images can be generated according to, for example:

$$I' = p\alpha D + (1-\alpha)I \quad (12)$$

I and I' can be the original clean and generated noisy image, respectively. α can be a transparency mask the same size as the image, D can be the additive component of the dirt, also the same size as the image p can be a random perturbation vector in RGB space, and the factors pαD can be multiplied together element-wise. p can be drawn from a uniform distribution over (0.9, 1.1) for each of red, green and blue, then multiplied by another random number between 0 and 1 to vary brightness. These random perturbations can be included to capture natural variation in the corruption, and can make the network robust to these changes.

Figure 4A:
FIG. 4A is an exemplary image illustrating a training data capture setup for dirt according to an exemplary embodiment of the present disclosure.

To find α and αD, pictures of several backgrounds were taken and displayed on a projector screen 405, both with and without a dirt-on-glass pane 410 placed in front of the camera 415. (See e.g., FIG. 4A). Because a projector was used to switch backgrounds, and the camera 415 was not moved, the resulting images can be pixel-aligned, thus yielding multiple examples of each pixel under dirt and non-dirt conditions. Then a least-squares system can be solved to find the values for α and αD at each pixel. Given captured image pairs $\{(I_k, I'_k)\}_{k=1}^{K}$, K≥4, the system of K equations implied by the exemplary generation model at each pixel location (x, y) can be solved by, for example:

$$I'_k(x,y) = \alpha(x,y)D(x,y) + (1-\alpha(x,y))I_k(x,y), k=1, \ldots, K \quad (13)$$

In the exemplary system, method and computer-accessible medium, the backgrounds of solid white, red, green and blue can be projected. The dirt can also be illuminated directly using a spotlight, to reduce effects of backlighting from the projector and to help shorten exposure time.

Exemplary Removal of Water Droplets

Figure 4B:
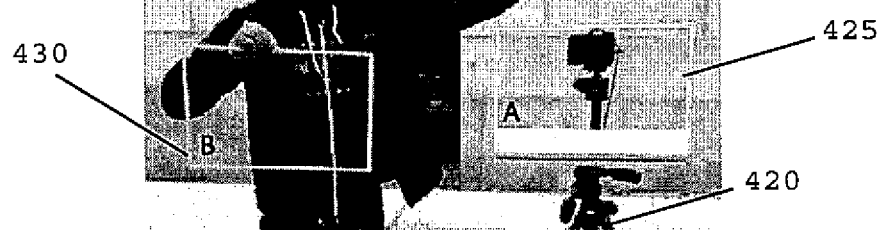
FIG. 4B is an exemplary image illustrating a training capture setup for water drops according to an exemplary embodiment of the present disclosure.

Unlike dirt, water droplets can refract light around them and may not be well described by a simple additive model. Thus, instead of synthesizing the effects of water, a training set can be built by taking photographs of multiple scenes with and without the corruption present. For corrupt images, the effect of rain can be simulated on a window by spraying water on a pane of anti-reflective $MgF_2$-coated glass placed between the camera and the scene, taking care to produce drops that closely resemble real rain. Using the tripod setup 420 shown in FIG. 4B, one picture can be taken with a clean piece of glass in place 425, then swap the glass for the one with water 430. A single-pixel-scale, for example, can reduce differences by downsampling the resulting images by a factor of 2. This setup can capture pixel-aligned image pairs that can be used for training.

Although the time between captures for each pair can be fairly short (e.g., only several seconds), there can be global illumination changes that can cause an approximate mean shift between corresponding clean and rain images. These can be corrected for by scaling the clean image in each pair by a single constant value, chosen to minimize average error between it and the corresponding noisy image. In addition, it can be beneficial to minimize object motion between corresponding images, in order for their difference to be limited to the difference in corruption. This can be addressed by using pictures of mostly-static scenes for the training set.

Exemplary Comparison to Baseline Methods

The exemplary system, method and computer-accessible medium can be compared against three baseline approaches, for example: median filtering, bilateral filtering (see e.g., References 16 and 21), and BM3D. (See e.g., Reference 4). In each case, the exemplary procedure parameters can be tuned to yield the best qualitative performance in terms of visibly reducing noise while keeping clean parts of the image intact. On the dirt images, an 8×8 window can be used for the median filter, parameters $o_s=3$ and $o_r=0.3$ for the bilateral filter, and v=0.15 for BM3D. For the rain images, similar parameters can be used, but adjusted for the fact that the images can be downsampled by half: 5×5 for the median filter, $o_s=2$ and $o_r=0.3$ for the bilateral filter, and o=0.15 for BM3D.

Exemplary Experiments: Dirt

The dirt removal can be tested by executing the exemplary network on pictures of various scenes taken behind dirt-on-glass panes. Test images can be captured using different glass panes from those used in training, ensuring that the network did not simply memorize and match exact patterns.

The exemplary network can be trained using 5.8 million examples of 64×64 image patches with synthetic dirt, paired with ground truth clean patches. To remove flat regions from the training cases, only examples where the variance of the clean patch can be at least 0.001 can be trained. The variance can be computed across pixel locations for each color channel first, then the mean of the three variances can be compared against the threshold; at least 1 pixel in the patch can have a dirt α-mask value of at least 0.03.

Exemplary Synthetic Dirt Results

The quantitative performance using synthetic dirt can be measured. The exemplary results are shown in Table 1. For example, synthetic test examples can be generated using images and dirt masks held out from the training set. The exemplary system, method and computer-accessible medium can outperform the previous methods, which do not make use of the structure in the corruption that the exemplary network learns.

TABLE 1

Mean PSNR result for the exemplary neural-network model and 3 previous methods on a synthetically generated test set of 24 images (8 scenes with 3 different dirt masks). The exemplary approach significantly out-performs the previous methods.

|  | Input | Exemplary Network | Bilateral | Median | BM3D |
| --- | --- | --- | --- | --- | --- |
| Mean PSNR: | 28.70 | 33.07 | 29.56 | 31.29 | 29.68 |
| Std. Dev | ±0.95 | ±1.74 | ±0.92 | ±1.06 | ±0.91 |
| Gain over Input | — | 4.37 | 0.87 | 2.59 | 0.98 |

Exemplary Real Dirt Results

Figure 6A:
FIGS. 6A and 6B are exemplary images of dirt images being restored according to an exemplary embodiment of the present disclosure.
Figure 6B:
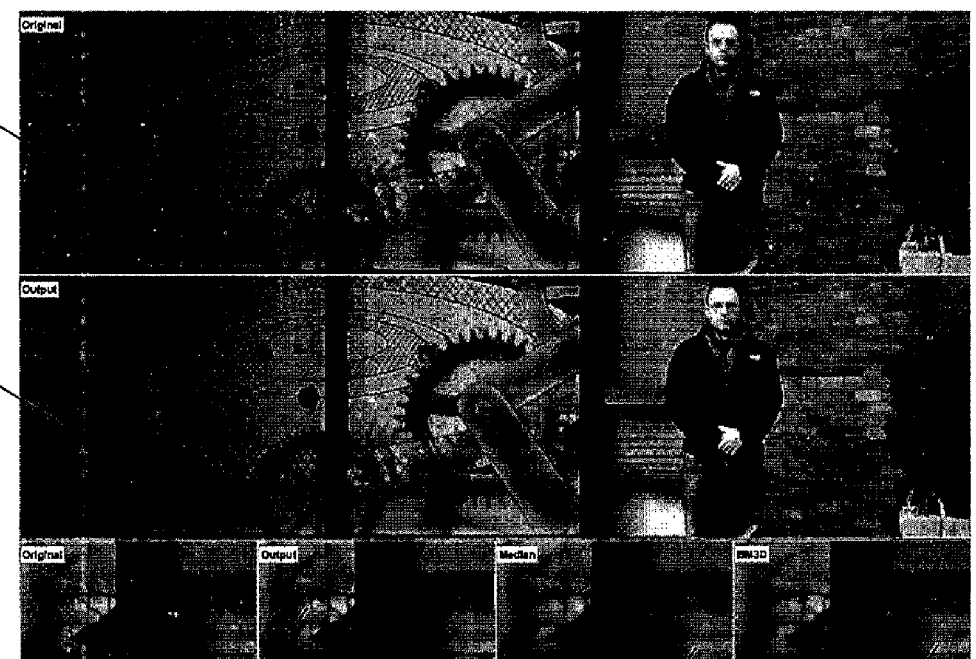

Examples of real test images are shown in FIGS. 6A and 6B. Each shows the original input images 605 and 610, along with the exemplary output images 615 and 620, and the outputs of previous methods (e.g., see images 625 and 630). The exemplary system, method and computer-accessible medium can remove most of the corruption while retaining details in the image, particularly the branches and shutters in FIG. 6A and edges in the artwork in FIG. 6B. The median filter (e.g., images 635 and 640), and bilateral filters (e.g., images 645 and 650), can remove small specks of dirt well, but lose much of the detail present in the original. Further, the neural network can leave already-clean parts of the image mostly untouched.

Exemplary Experiments: Water Droplets

The exemplary water droplet removal network can be executed on two sets of test data, for example: (i) pictures of scenes taken through a pane of glass on which water can be sprayed to simulate rain, and (ii) pictures of scenes taken while it can be actually raining, from behind an initially clean glass pane. Both exemplary sets can be composed of real-world outdoor scenes not in the training set. For (i), the same technique can be used as described above to collect the data. For (ii), a clean pane of glass can be set on a tripod, and then let rain fall onto it. Pictures can then be taken at regular intervals, with the camera placed similarly relative to the glass. In each case, the images can be downsampled by a factor of 2 before applying the exemplary procedure or the baselines.

The exemplary network can be trained using, for example, 6.5 million examples of 64×64 image patch pairs. Again, similarly to the dirt case, an average variance threshold of 0.001 can be used on the clean images to remove flat samples. In order not to present the exemplary network many example pairs without differences, each training pair can have at least, for example, 1 pixel difference over 0.1 in any color channel, evaluated over those pixels where the clean image had a value no greater than 0.95 in all channels, this second part can be beneficial due to oversaturated areas of the clean image differing from the corresponding corrupt areas after adjusting for global illumination changes.

Examples of exemplary pictures taken using the exemplary system, method and computer-accessible medium in which sprayed-on water is removed are shown in FIGS. 7A and 7B, which illustrate original input images 705 and 710, along with the exemplary output images 715 and 720, and the outputs of previous methods (e.g., images 725 and 730). The median filters providing exemplary images 735 and 740, and bilateral filters providing exemplary images 745 and 750, can remove small specks of dirt well, but lose much of the detail present in the original.

The exemplary system, method and computer-accessible medium, according to an exemplary embodiment of the present disclosure, can remove most of the water droplets, while preserving finer details and edges. This can be particularly apparent compared to the baseline approaches which must blur the image substantially before visibly reducing the corruption.

Despite the fact that the exemplary network can be trained on mostly-static scenes to limit object motion between clean/noisy pairs, it can still preserve the structure of animate parts of the images. The face and body of the subject can be reproduced with few visible artifacts, as can be the plants and leaves, which move from wind, in FIG. 7B.

Figure 8:
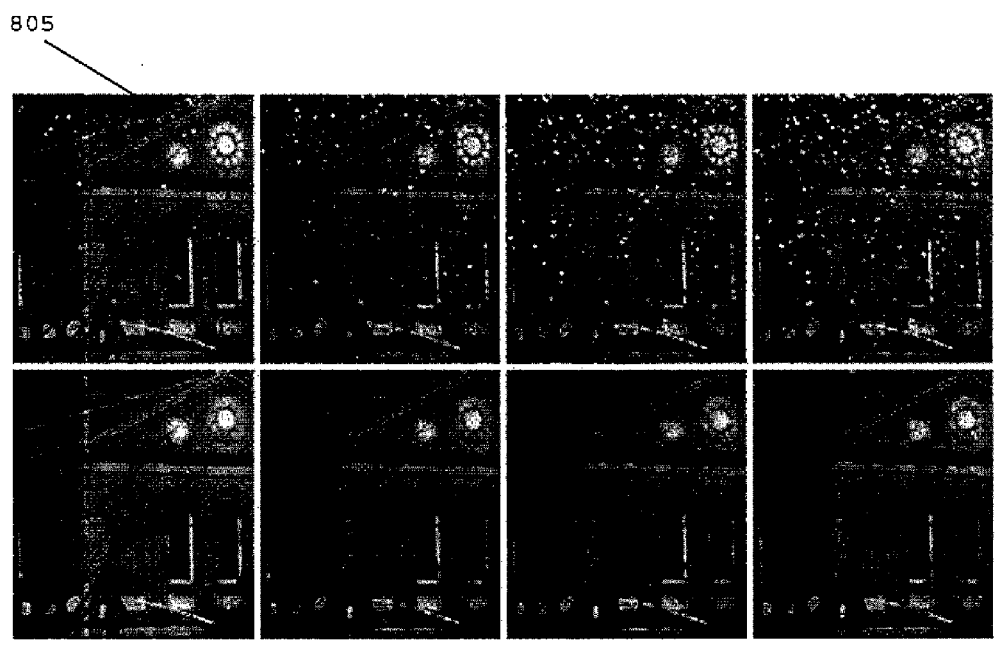
FIG. 8 is a set of exemplary images of an exemplary rain video sequence according to an exemplary an exemplary embodiment of the present disclosure.

An image sequence of frame(s) 800 of actual rain falling on a pane of glass is shown in FIG. 8, which also includes a video of this time series in the supplementary material. Each frame 805 of the sequence 800 can be presented to the exemplary system, method and computer-accessible medium independently, for example, and no temporal filtering can be used. To capture this exemplary sequence 800, a clean glass can be set on pane on a tripod and can facilitate rain to fall onto it. Pictures can then be taken at regular intervals, about every 20 s. The camera can be positioned, for example, approximately 0.5 m behind the glass, and can be focused on the scene behind.

Figure 9A:
FIGS. 9A and 9B are exemplary images taken with a smartphone shot through a rainy window on a train before and after the image has been cleaned according to an exemplary embodiment of the present disclosure.
Figure 9B:

Further, in addition to the pictures captured using a DSLR, FIG. 9A shows an exemplary original image taken with a smartphone, while FIG. 9B shows the output of the exemplary rain network when applied to the picture of FIG. 9A. While the scene and reflections can be preserved, raindrops on the window can be removed, though a few small artifacts do remain. This demonstrates that the exemplary system, method and computer-accessible medium can restore images taken by a variety of camera types.

Although the problem appears underconstrained, the artifacts have a distinctive appearance which can be learned with a large neural-network and a carefully constructed training set. Results on real test examples show most artifacts being removed without undue loss of detail, unlike existing approaches such as median or bilateral filtering.

Although only day-time outdoor shots have been exemplified, the exemplary system, method and computer-accessible medium according to various exemplary embodiments of the present disclose can be extended to other settings, such as, for example, indoor or nighttime, given suitable training data. The learning-based approach could also be extended to other problem domains such as scratch removal and color shift correction.

The exemplary system, method and computer-accessible medium, according to exemplary embodiments of the present disclosure, can facilitate and/or be utilized for and with a number of potential exemplary applications such as (i) a digital car windshield that could aid driving in adverse weather conditions, or (ii) enhancement of footage from security or automotive cameras mounted in exposed locations. High-performance low-power neural-network implementations such as the NeuFlow FPGA/ASIC (see e.g., Reference 7) can make real-time embedded applications of the exemplary system, method and computer-accessible medium feasible.

Figure 10:
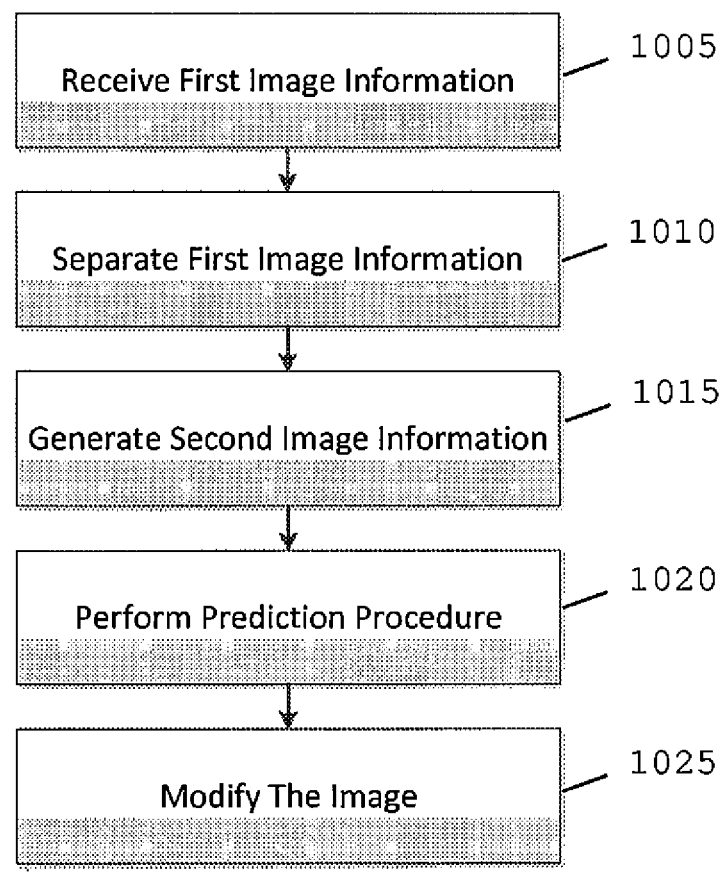
FIG. 10 is a flow diagram of an exemplary method for modifying an image according to an exemplary embodiment of the present disclosure.

FIG. 10 is an exemplary flow diagram of an exemplary method for modifying an image according to an exemplary embodiment of the present disclosure. For example, at procedure 1005, first image information for an image can be received. The first image information can be separated into at least two overlapping images at procedure 1010, and second image information can be generated at procedure 1015. At procedure 1020 a prediction procedure can be performed based on the second image information, and at procedure 1025, the image can be modified.

Figure 11:
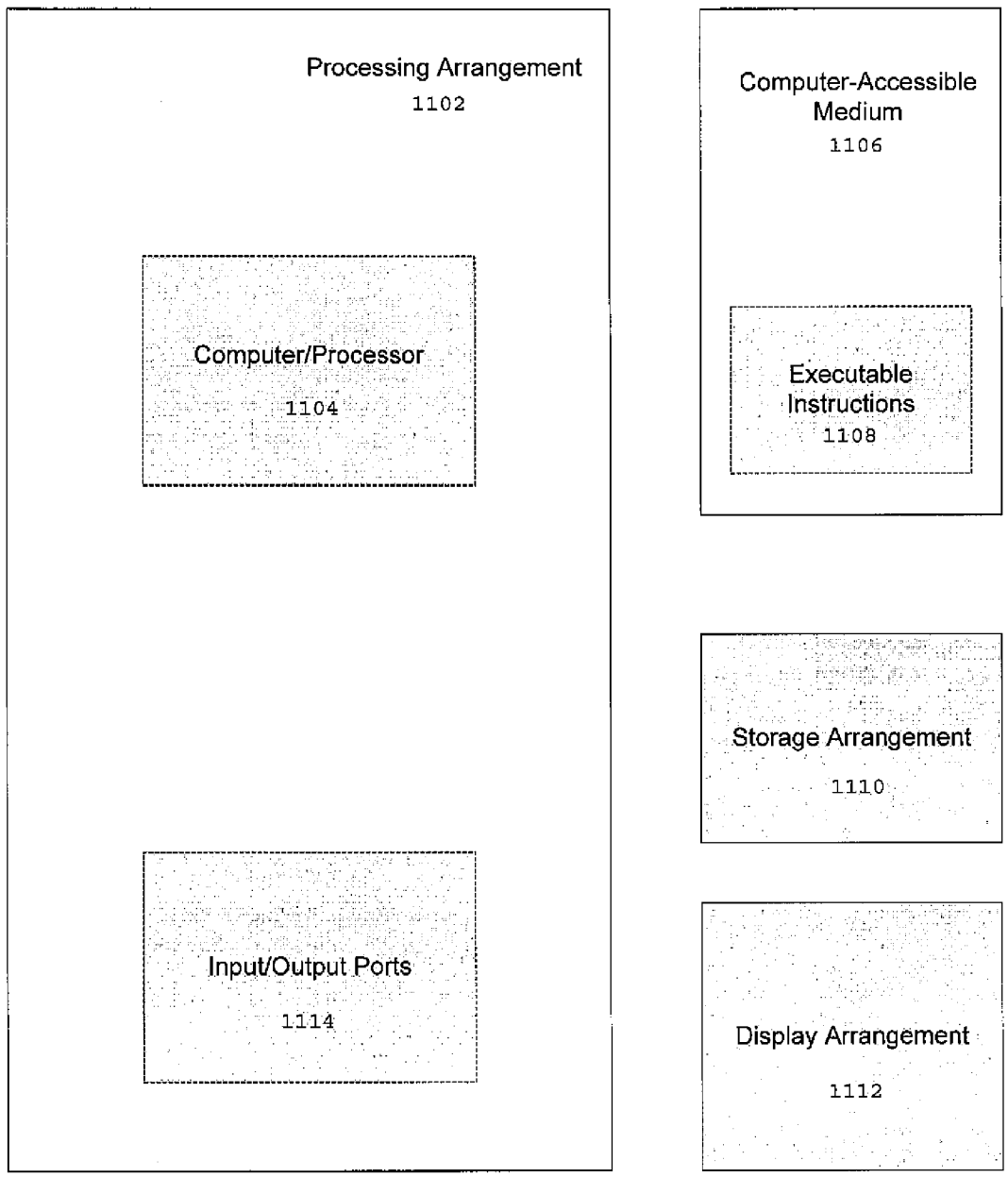
FIG. 11 is an illustration of an exemplary block diagram of an exemplary system in accordance with certain exemplary embodiments of the present disclosure.

FIG. 11 shows a block diagram of an exemplary embodiment of a system according to the present disclosure. For example, exemplary procedures in accordance with the present disclosure described herein can be performed by a processing arrangement and/or a computing arrangement 1102. Such processing/computing arrangement 1102 can be, for example entirely or a part of, or include, but not limited to, a computer/processor 1104 that can include, for example one or more microprocessors, and use instructions stored on a computer-accessible medium (e.g., RAM, ROM, hard drive, or other storage device).

As shown in FIG. 11, for example a computer-accessible medium 1106 (e.g., as described herein above, a storage device such as a hard disk, floppy disk, memory stick, CD-ROM, RAM, ROM, etc., or a collection thereof) can be provided (e.g., in communication with the processing arrangement 1102). The computer-accessible medium 1106 can contain executable instructions 1108 thereon. In addition or alternatively, a storage arrangement 1110 can be provided separately from the computer-accessible medium 1106, which can provide the instructions to the processing arrangement 1102 so as to configure the processing arrangement to execute certain exemplary procedures, processes and methods, as described herein above, for example.

Further, the exemplary processing arrangement 1102 can be provided with or include an input/output arrangement 1114, which can include, for example a wired network, a wireless network, the internet, an intranet, a data collection probe, a sensor, etc. As shown in FIG. 11, the exemplary processing arrangement 1102 can be in communication with an exemplary display arrangement 1112, which, according to certain exemplary embodiments of the present disclosure, can be a touch-screen configured for inputting information to the processing arrangement in addition to outputting information from the processing arrangement, for example. Further, the exemplary display 1112 and/or a storage arrangement 1110 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCES

The following references are hereby incorporated by reference in their entirety.

[1] BARNUM, P., NARASIMHAN, S., AND TAKEO, K. 2010. Analysis of rain and snow in frequency space. *International Journal of Computer Vision (IJCV)* 86, 2, 256-274.

[2] BOTTOU, L., AND BOUSQUET, O. 2008. The tradeoffs of large scale learning. In Advances in Neural Information Processing Systems (NIPS), 161-168.

[3] BURGER, H., SCHULER, C., AND HARMELING, S. 2012. Image denoising: Can plain neural networks compete with BM3D? In *IEEE Conf on Computer Vision and Pattern Recognition (CVPR)*.

[4] DABOV, K., FOI, A., KATKOVNIK, V., AND EGIAZARIAN, K. 2006. Image denoising with block-matching and 3D filtering. In *Proc. SPIE Electronic Imaging*.

[5] DONG, B., JI, H., LI, J., SHEN, Z., AND XU, Y. 2011. Wavelet frame based blind image inpainting. *Applied and Computational Harmonic Analysis* 32, 2, 268-279.

6 ELAD, M., AND AHARON, M. 2006. Image denoising via learned dictionaries and sparse representation. In *IEEE Conf on Computer Vision and Pattern Recognition (CVPR)*.

7 FARABET, C., MARTINI, B., CORDA, B., AKSELROD, P., CULURCIELLO, E., AND LECUN, Y. 2011. NeuFlow: A runtime reconfigurable dataflow processor for vision. In *Proc. of the 5th IEEE Workshop on Embedded Computer Vision (ECV'11 at CVPR'11)*.

[8] GARG, K., AND NAYAR, S. 2004. Detection and removal of rain from videos. In *IEEE Conf on Computer Vision and Pattern Recognition (CVPR)*, 528-535.

[9] GU, J., RAMAMOORTHI, R., BELHUMEUR, P., AND NAYAR, S. 2007. Dirty Glass: Rendering Contamination on Transparent Surfaces. In *Proceedings of Eurographics Symposium on Rendering*.

[10] GU, J., RAMAMOORTHI, R., BELHUMEUR, P., AND NAYAR, S. 2009. Removing Im-5 age Artifacts Due to Dirty Camera Lenses and Thin Occluders. *ACM Transactions on Graphics (Proceedings of SIGGRAPH Asia)* (December).

[11] JAIN, V., AND SEUNG, S. 2008. Natural image denoising with convolutional networks. In *Advances in Neural Information Processing Systems (NIPS)*.

[12] LECUN, Y., BOTTOU, L., BENGIO, Y., AND HAFFNER, P. 1998. Gradient-based learning applied to document recognition. *Proceedings of the IEEE* 86, 11 (November), 2278-2324.

[13] LEVIN, A., AND NADLER, B. 2011. Natural image denoising: Optimality and inherent bounds. In *IEEE Conf. on Computer Vision and Pattern Recognition (CVPR)*.

[14] NING, F., DELHOMME, D., LECUN, Y., PIANO, F., BOTTOU, L., AND BARBANO, P. 2005. Toward automatic phenotyping of developing embryos from videos. *IEEE Trans. on Image Processing* 14, 9, 1360-1371.

[15] OLSHAUSEN, B. A., AND FIELD, D. J. 1997. Sparse coding with an overcomplete basis set: A strategy employed by V 1? *Vision Research* 37, 23, 3311-3325.

[16] PARIS, S., AND DURAND, F. 2006. A fast approximation of the bilateral filter using a signal processing approach. In *European Conf on Computer Vision (ECCV)*, IV: 568-580.

[17] PORTILLA, J., STRELA, V., WAINWRIGHT, M. J., AND SIMONCELLI, E. P. 2003. Image denoising using scale mixtures of Gaussians in the wavelet domain. *IEEE Trans Image Processing* 12, 11 (November), 1338-1351.

[18] ROSER, M., AND GEIGER, A. 2009. Video-based raindrop detection for improved image registration. In *ICCV Workshop on Video-Oriented Object and Event Classification*.

[19] ROSER, M., KURZ, J., AND GEIGER, A. 2010. Realistic modeling of water droplets for monocular adherent raindrop recognition using bezier curves. In *ACCV Workshop on Computer Vision in Vehicle Technology: From Earth to Mars*.

[20] ROTH, S., AND BLACK, M. J. 2009. Fields of experts. *International Journal of Computer Vision (IJCV)* 82, 2, 205-229.

[21] TOMASI, C., AND MANDUCHI, R. 1998. Bilateral filtering for gray and color images. In *IEEE Conf on Computer Vision and Pattern Recognition (CVPR)*.

[22] WILLSON, R. G., MAIMONE, M. W., JOHNSON, A, E., AND SCHERR, L. M. 2005. An optical model for image artifacts produced by dust particles on lenses. In

[22] 8th International Symposium on Artificial Intelligence, Robotics, and Automation in Space (i-SAIRAS), vol. 1.
[23] XIE, J., XU, L., AND CHEN, E. 2012. Image denoising and inpainting with deep neural networks. In *Advances in Neural Information Processing Systems (NIPS)*.
[24] ZHANG, S., AND SALARI, E. 2005. Image denosing using a neural network based non-linear filter in the wavelet domain. In *ICASSP*.
[25] ZHOU, C., AND LIN, S. 2007. Removal of image artifacts due to sensor dust. In *IEEE Conf on Computer Vision and Pattern Recognition (CVPR)*.
[26] ZHU, S. C., AND MUMFORD, D. 1997. Prior learning and gibbs reaction-diffusion. *IEEE. Pattern Analysis and Machine Intelligence (PAMI)* 19, 11, 1236-1250.
[27] ZORAN, D., AND WEISS, Y. 2011. From learning models of natural image patches to whole image restoration. In *International Conf on Computer Vision (ICCV)*.

What is claimed is:

1. A non-transitory computer-accessible medium having stored thereon computer-executable instructions for modifying at least one image, wherein, when a computer hardware arrangement executes the instructions, the computer arrangement is configured to perform procedures comprising:
receiving first image information for the at least one image;
generating second image information by separating the first image information into at least two overlapping images; and
modifying the at least one image using a prediction procedure based on the second image information
wherein the prediction procedure is associated with at least one convolutional neural network that receives each of the overlapping images as an input.

2. The non-transitory computer-accessible medium of claim 1, wherein the prediction procedure includes an average prediction determination for each overlapping pixels of the at least two overlapping images.

3. The non-transitory computer-accessible medium of claim 1, wherein the prediction procedure further includes predicting a clean image for at least one of the overlapping images.

4. The non-transitory computer-accessible medium of claim 1, wherein the at least one convolutional neural network includes at least two convolutional neural networks, and wherein each of the at least two convolutional neural networks is configured to remove at least one of dirt, debris or water from the at least one image.

5. The non-transitory computer-accessible medium of claim 1, wherein the at least one convolutional neural network includes a series of layers.

6. The non-transitory computer-accessible medium of claim 5, wherein each of the layers applies a linear map to at least one of the overlapping images.

7. The non-transitory computer-accessible medium of claim 6, wherein each of the layers further applies an element-wise sigmoid to at least one of the overlapping images.

8. The non-transitory computer-accessible medium of claim 4, wherein the prediction procedure includes the at least one convolutional neural network.

9. The non-transitory computer-accessible medium of claim 1, wherein the modification includes removing components of the at least one image associated with at least one of dirt, debris, or water from the at least one image.

10. The non-transitory computer-accessible medium of claim 9, wherein the at least one convolutional neural network includes at least three convolutional neural networks, a first convolutional neural network for the removal of the dirt, a second convolutional neural network for the removal of the debris and a third convolutional neural network for the removal of the water.

11. The non-transitory computer-accessible medium of claim 1, wherein the first image information includes information from a picture taken through a window having at least one of dirt, debris or water thereon.

12. The non-transitory computer-accessible medium of claim 1, wherein the computer arrangement is further configured to generate at least one weight for use by the prediction procedure.

13. The non-transitory computer-accessible medium of claim 12, wherein the computer arrangement is further configured to generate the at least one weight by minimizing a mean squared error over a dataset of corresponding noisy and clean image pairs.

14. The non-transitory computer-accessible medium of claim 13, wherein the computer arrangement is further configured to reduce a loss of the mean squared error.

15. The non-transitory computer-accessible medium of claim 14, wherein the computer arrangement is further configured to reduce the loss using a Stochastic Gradient Descent.

16. The non-transitory computer-accessible medium of claim 15, wherein the computer arrangement is further configured to determine a gradient of the error by back-propagating a depatchifying procedure.

17. The non-transitory computer-accessible medium of claim 12, wherein the computer arrangement is further configured to initialize the at least one weight by randomly drawing from a normal distribution with a mean of about 0 and a standard deviation of about 0.001.

18. The non-transitory computer-accessible medium of claim 12, wherein the computer arrangement is further configured to decorrelate the at least one weight.

19. A method for modifying at least one image, comprising:
receiving first image information for the at least one image;
generating second image information by separating the first image information into at least two overlapping images; and
using a computer hardware arrangement, modifying the at least one image using a prediction procedure based on the second image information
wherein the prediction procedure is associated with at least one convolutional neural network that receives each of the overlapping images as an input.

20. A system for modifying at least one image, comprising a computer hardware arrangement configured to:
receive first image information for the at least one image;
generate second image information by separating the first image information into at least two overlapping images; and
modify the at least one image using a prediction procedure based on the second image information
wherein the prediction procedure is associated with at least one convolutional neural network that receives each of the overlapping images as an input.

21. The non-transitory computer-accessible medium of claim 4, wherein the at least one of the dirt, debris or water is from a picture taken through a window.

22. The non-transitory computer-accessible medium of claim 9, wherein the at least one of the dirt, debris or water is from a picture taken through a window.

\* \* \* \* \*